United States Patent

Brown

[15] 3,649,908
[45] Mar. 14, 1972

[54] MAGNETIC FIELD GRADIOMETER UTILIZING A PAIR OF CORES DRIVEN BY A BLOCKING OSCILLATOR

[72] Inventor: Robert E. Brown, Silver Spring, Md.
[73] Assignee: The United States of America as represented by the Secretary of the Navy
[22] Filed: Oct. 12, 1970
[21] Appl. No.: 79,837

[52] U.S. Cl. .................................... 324/43 G, 324/43 R
[51] Int. Cl. ................................................ G01r 33/02
[58] Field of Search ............... 324/43 R, 43 G, 47; 331/64, 331/65, 112, 146

[56] References Cited

UNITED STATES PATENTS 3,448,376  6/1969  Geyger ............................. 324/47
3,541,432  11/1970  Scarbrough ....................... 324/43 R Primary Examiner—Rudolph V. Rolinec
Assistant Examiner—R. J. Corcoran
Attorney—R. S. Sciascia and J. O. Tresansky

[57] ABSTRACT

A gradiometer having in one embodiment two ring cores of high magnetic permeability with drive windings thereon and a blocking oscillator supplying unidirectional current to the drive windings to drive the cores around a portion of the hysteresis curve. The blocking oscillator drive circuit is controlled by feedback windings around both cores. A pair of sense windings are wound on each core, and each sense winding carries a signal composed of the induced drive signal and a magnetic field induced signal that varies with the ambient fields. The sense windings are connected to a demodulator circuit so that the induced drive signals cancel out and only the difference in ambient fields between the two ring cores is passed, indicative of the gradient in the DC magnetic field. In an alternative embodiment, ferromagnetic scroll cores replace the ring cores.

9 Claims, 6 Drawing Figures

PATENTED MAR 14 1972

INVENTOR
Robert E. Brown

BY

J.O. Tresansky
ATTORNEY

MAGNETIC FIELD GRADIOMETER UTILIZING A PAIR OF CORES DRIVEN BY A BLOCKING OSCILLATOR

BACKGROUND OF THE INVENTION

This invention relates generally to gradiometers and, more particularly, to a low-power gradiometer.

Gradiometers have been utilized heretofore to provide detection and measurement of DC or low-frequency AC magnetic field gradients. Such prior art gradiometers, although operating satisfactorily are, however, relatively complex. As a result, these devices are costlier to produce, have relatively high power consumption, and generate a substantial amount of noise which impairs their ability to measure very small magnetic gradients. Simplified circuitry has been achieved, however, in ring-core magnetometers, devices for measuring the magnitude of ambient magnetic fields. Such a device is disclosed in U.S. application Ser. No. 49,466 filed June 24, 1970, now abandoned and replaced by continuation-in-part Ser. No. 93,619 filed Nov. 30, 1970 by Robert E. Brown, on an invention entitled "Low Power Ring-Core Magnetometer." This magnetometer is simple in construction, inexpensive to produce, has low power consumption and relatively little internal noise. Heretofore, it has not been possible to embody these desirable properties of a ring-core magnetometer in a gradiometer.

SUMMARY OF THE INVENTION

Accordingly, one object of the present invention is to provide a new and improved gradiometer composed of a small number of componential elements.

Another object of the invention is the provision of a new and improved ring-core gradiometer.

Still another object of the present invention is to provide a ringcore gradiometer having low power consumption.

A further object of the instant invention is to provide a gradiometer having relatively little internal noise.

A still further object of this invention is the provision of a scroll core gradiometer.

Briefly, these and other objects of the present invention are attained by providing a gradiometer having in one embodiment a ring core and a blocking oscillator drive circuit which utilizes the same ring cores as the gradiometer to drive the gradiometer with unidirectional current thereby requiring low power consumption. Sense windings wound on the ring cores are connected in a manner such that the blocking oscillator drive signals cancel and only the difference in ambient field between the ring cores is applied to an output demodulator circuit. In an alternative embodiment, the ring cores are replaced with ferromagnetic scrolls and the drive windings and sense windings are wound thereon.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
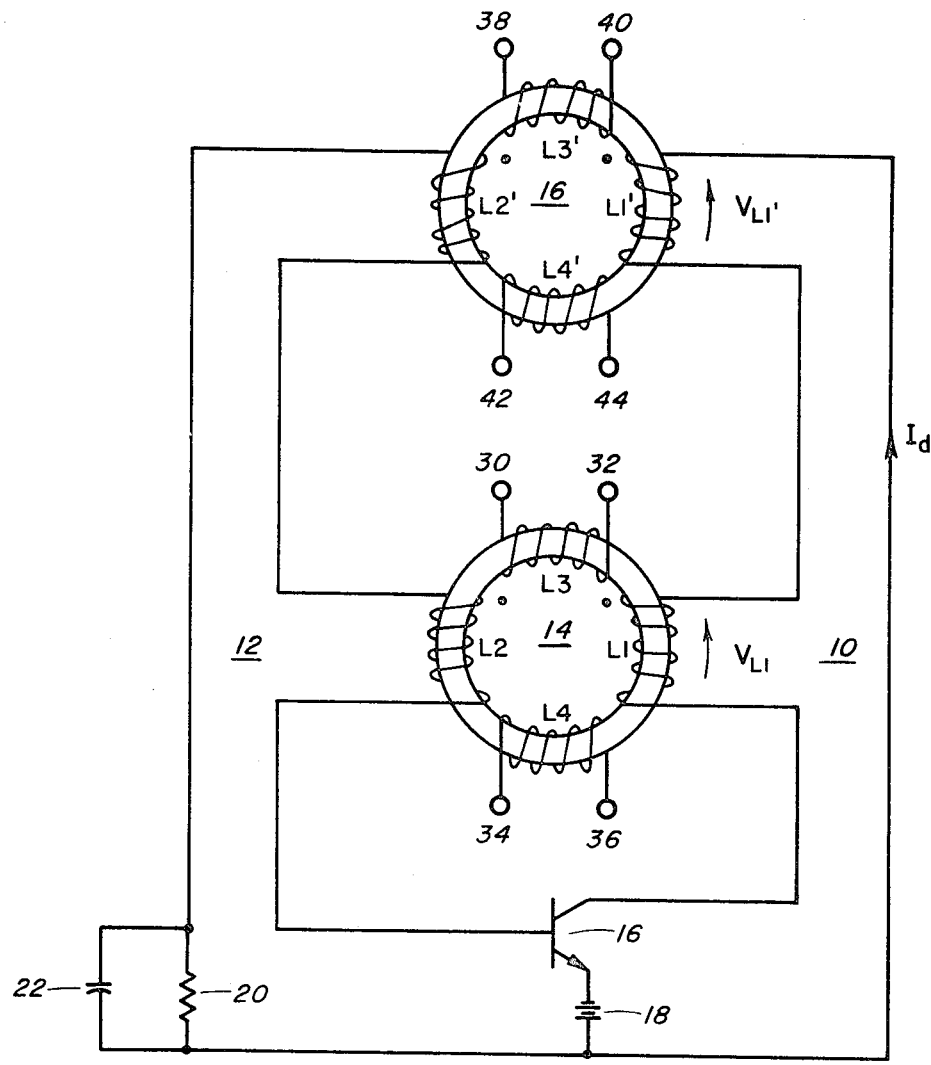
FIG. 1 is a schematic diagram of the gradiometer drive circuitry according to the invention.

Referring now to the drawings, wherein like reference characters designate corresponding parts throughout the several views, and more particularly to FIG. 1 thereof, the ring-core gradiometer drive circuitry is shown as consisting of a drive loop 10, and a feedback loop 12. A ring core 14 constructed in the form of a toroid of a saturable high-permeability material such as, for example, Permalloy or the like, transformer couples drive loop 10 to feedback loop 12 by means of drive winding L1, and feedback winding L2, each of which is wound uniformly around 360° of ring core 14. Similarly, a ring core 16 of the same material transformer couples drive loop 10 to feedback loop 12 by means of a drive winding L1', and a feedback winding L2', each of which is wound uniformly around 360° of ring core 16. In drive loop 10 one end of winding L1 is connected in series to one end of winding L1'. The other end of winding L1 is connected to a semiconductor switching element 16, such as, for example, a collector of an NPN transistor. The emitter of transistor 16 is connected to one end of a source of unidirectional potential 18, such as the negative terminal of a battery, and the positive terminal thereof is connected to the other end of winding L1' thereby completing the series circuit of drive loop 10. In feedback loop 12 one end of winding L2 is connected in series to one end of winding L2' while the other end of winding L2 is connected to the base of transistor 16. The other end of winding L2' is connected through the parallel combination of a resistor 20 and a capacitor 22 to positive terminal of battery 18, to complete the series circuit of feedback loop 12.

Figure 2A:
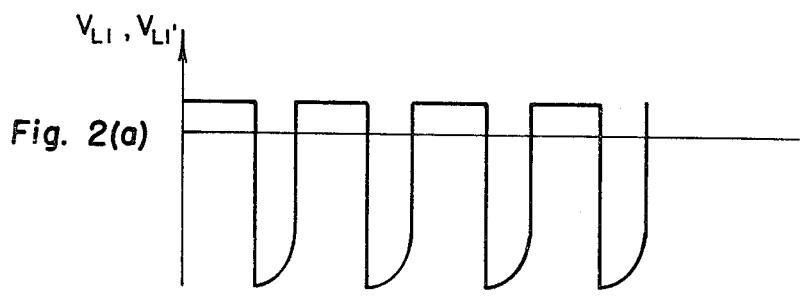
FIGS. 2(a) and 2(b) are graphical diagrams of various wave shapes associated with the drive circuitry of FIG. 1.
Figure 2B:
Figure 4:
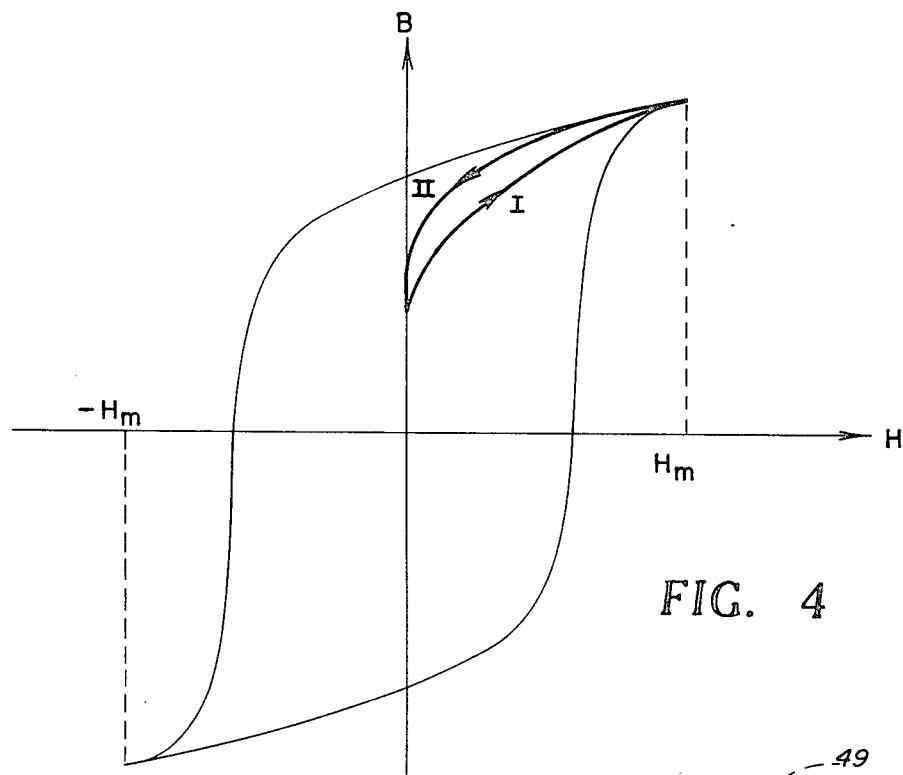
FIG. 4 is a graphical diagram of a hysteresis curve associated with the gradiometer of the invention.

The operation of the gradiometer driving circuitry can be most readily understood with reference to FIGS. 2(a) and 2(b). It will be assumed that the beginning of a blocking oscillator cycle begins with transistor 16 turned on. Voltages $V_{L1}$ across winding $L_1$ and $V_{L1}$, across winding L1' will be essentially constant at a positive value which is slightly less than one-half the voltage of battery 18. This will be readily understood by noting that windings L1 and L1' act as an equal voltage divider, each winding having the same number of turns, and the total voltage available for division is the battery voltage minus the small voltage drop across conducting transistor 16. After transistor 16 has been turned on, the current $I_d$ in drive loop 10 begins to increase, as shown in FIG. 2(b). As the current $I_d$ increases the magnetic intensity H and flux density B increase along curve 1 illustrated in FIG. 4 which shows the hysteresis loop of cores 14 and 16. The increasing flux in drive winding L1 generates a voltage in feedback winding L2 which, by virtue of the winding pattern is in phase opposition to $V_{L1}$. Similarly, the increase in flux in drive winding L1' generates a voltage in feedback winding L2' which is in phase opposition to $V_{L1}'$. Consequently, positive feedback is generated and transistor 16 remains on as long as drive current $I_d$ increases. With the voltages across windings L2 and L2' being in series aiding relationship with battery 18, capacitor 22 begins to charge up to the sum of these three voltages. As the current $I_d$ in windings L1 and L1' increases portion I of the hysteresis loop of FIG. 4 is followed until saturation occurs at a value of magnetic intensity $H_m$. At this point, the flux density B ceases to change and the voltages across windings L2 and L2' abruptly fall to zero. The voltage across capacitor 22 is now greater than the battery voltage 18 and transistor 16 is reverse biased and turns off. Since drive loop 10 is now an open circuit, current $I_d$ abruptly falls to zero, as shown in FIG. 2(b), and voltages $V_{L1}$ and $V_{L1}'$, being proportional to the derivative of current $I_d$ simultaneously fall to some large negative value. With zero voltages across windings L2 and L2', capacitor 22 discharges through resistor 20 until it reaches a voltage equal to the battery voltage. At this point transistor 16 is again forward biased and turns on, causing the cycle to repeat.

When transistor 16 turns off, windings L1 and L1' return to zero magnetic intensity along portion 2 of the hysteresis curve, as illustrated in FIG. 4. Since the total power consumption in the drive loop is proportional to the area enclosed by curves 1 and 2 of the hysteresis curve, it will be observed that a relatively small amount of power is consumed in the drive loop 10 as compared to the power consumed on a complete traversal of the hysteresis loop. This result is achieved by virtue of having a unidirectional drive current in windings L1 and L1'.

Figure 3:
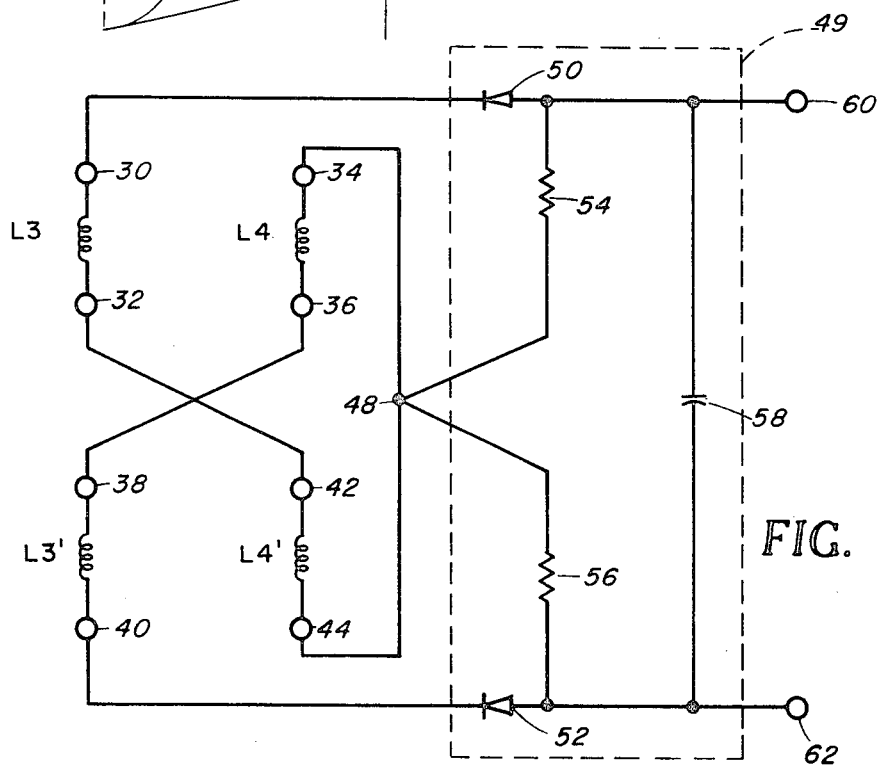
FIG. 3 is a schematic diagram of the sense windings and demodulator circuitry of one embodiment of the gradiometer of the present invention.

Winding L3, having terminals 30 and 32, and winding L4, having terminals 34 and 36, are the sense windings for core 14 and each is uniformly distributed on a 180° segment on opposite sides of the core. Similarly, winding L3', having terminals 38 and 40, and winding L4', having terminals 42 and 44, are the sense windings for core 16 and each is uniformly distributed on a 180° segment on opposite sides of the core. FIG. 3 illustrates how the sense windings are interconnected to form a gradiometer having uniform sensitivity throughout a large range including zero gradient. Terminal 32 of winding L3 is connected to terminal 42 of winding L4', terminal 38 of winding L3' is connected to terminal 36 of winding L4, and terminal 34 of winding L4 is connected to terminal 44 of winding L4' to form a common juncture 48. The sense windings are connected to an external demodulator circuit 49 in the following manner. Terminal 30 of winding L3 is connected to one side of a unidirectional conducting device 50, such as the cathode of a diode. Similarly, terminal 40 of winding L3' is connected to one side of a unidirectional conducting device 52, such as the cathode of a diode. A resistor 54 is connected between the anode of diode 50 and common juncture 48, and a resistor 56 is connected between the anode of diode 52 and common juncture 48. A capacitor 58 is connected between the anode of diode 50 and the anode of diode 52, and the output voltage appears across capacitor 58 between output terminals 60 and 62.

In operation, each sense winding carries a signal composed of the induced drive signal and a magnetic field dependent signal that varies with ambient field. The sense windings are connected in a manner such that the induced drive signal in winding L3 adds to the induced drive signal in winding L4', while the signal due to an external field impressed on winding L3 subtracts from the signal due to an external field impressed on winding L4'. Similarly, the induced signal in winding L3' adds to the induced drive signal in winding L4 while the signal due to external field impressed on winding L3' subtracts from the signal due to an external field impressed on winding L4. The sense windings are connected to the demodulator circuit 49 in such a manner that the large voltage spikes in the drive windings illustrated in FIG. 2(a) which are transformer coupled to the sense windings cause diodes 50 and 52 to be forward biased. Thus, the diodes are always conducting when even very small ambient field dependent signals are present. The additive drive signal in windings L3 and L4' flow through resistor 54, and the additive drive signal in windings L3' and L4 flow through resistor 56. By having resistors 54 and 56 of equal value, and having the same number of turns in windings L3 and L3', and the same number of turns in windings L4 and L4', the voltages across resistors 54 and 56 will be of equal magnitude but of opposite polarity. The drive voltages, therefore, cancel at the output of the demodulator. On the other hand, the resultant difference voltage between windings L3 and L4', representing the gradient of the external ambient field between ring cores 14 and 16 and the resultant difference voltage between windings L3' and L4, also representing the gradient of the external ambient field between ring cores 14 and 16 combine additively in resistors 54 and 56 to form a resultant voltage that is twice the gradient induced voltage. Thus, the circuitry of FIG. 2 acts as a voltage doubler for the gradient induced signal appearing at the output of demodulator 49, which increases the signal-to-noise ratio of the circuit, and reduces the effects of internal noise.

Since the demodulator circuitry has no active source of potential, the only source of power required for the gradiometer of the instant invention is battery 18. Consequently, the power drain is kept to a minimum.

Figure 5:
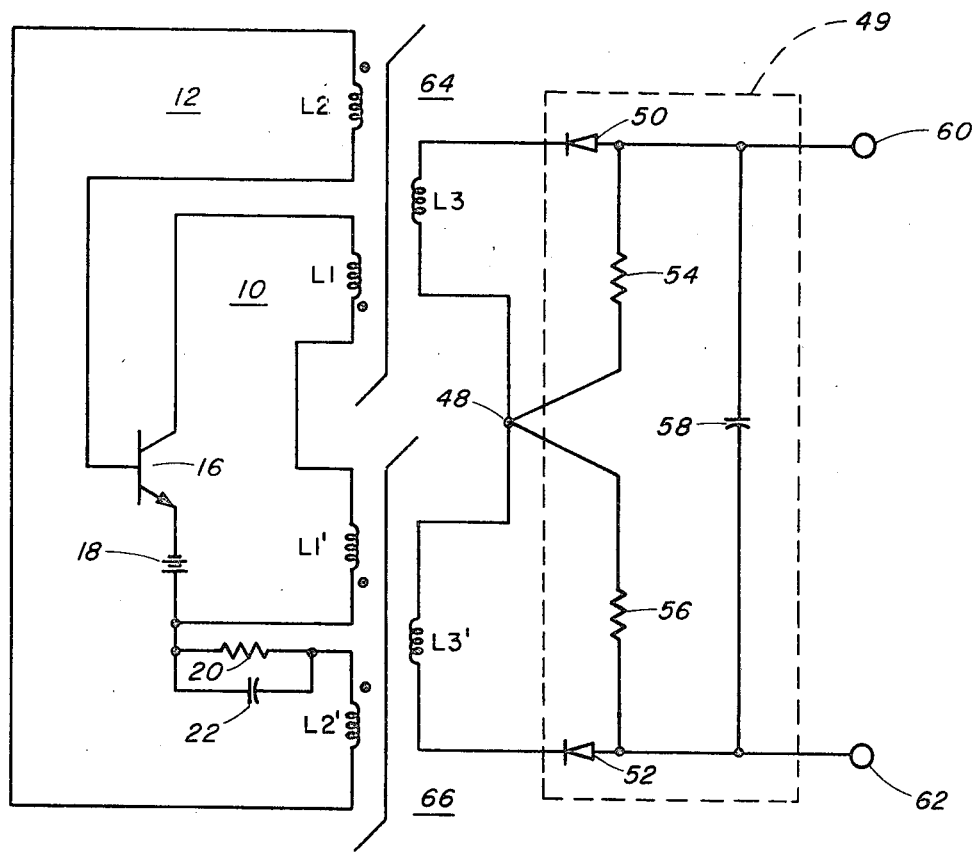
FIG. 5 is a schematic diagram of an alternative embodiment of the gradiometer of the present invention.

An alternative embodiment of the present invention is illustrated in FIG. 5 wherein the ring cores 14 and 16 are replaced by ferromagnetic scroll cores 64 and 66. In this embodiment the gradiometer sensitive direction is along the longitudinal axis of scroll cores 64 and 66. Drive winding L1 and feedback winding L2 are wound solenoidally around scroll core 64, and drive winding L1' and feedback winding L2' are wound solenoidally around scroll core 66. Operationally, the drive circuit of FIG. 5 performs in the same manner as the drive circuit of FIG. 1. The sense circuitry, however, employs only two sense windings L3 and L3'. Winding L3 is connected to winding L3' at common juncture 48. The other end of winding L3 is connected to the cathode of diode 50, and the other end of winding L3' is connected to the cathode of diode 52. Resistors 54 and 56 and capacitor 58 are connected as in FIG. 3.

In operation the drive voltage induced in sense winding L3 forward biases diode 50 and appears across resistor 54, while the drive voltage induced across winding L3' forward biases diode 52 and appears across resistor 56. The drive voltages appearing across resistors 54 and 56 cancel each other across the output terminals 60 and 62, as in the circuit of FIG. 3. In contradistinction to FIG. 3, however, the ambient field dependent signal induced in windings L3 and L3' are subtracted across resistors 54 and 56, thereby producing the gradient or difference between the ambient fields at scroll core 64 and scroll core 66. As a result, this embodiment does not produce the voltage doubling effect found in the circuit of FIG. 1, but this can be compensated for by increasing the number of turns on windings L3 and L3'. This arrangement generally requires more power than the ring core embodiment and is somewhat less sensitive. The coil winding procedure is, however, considerably simpler.

It should be apparent that although the drive windings L1 and L1' in both embodiments are shown as being connected in series, they may also be connected in parallel. It should also be apparent that the two ring cores or two scroll cores must be mounted apart to determine a spatial magnetic field gradient. Additionally, it should be apparent that capacitor 22 in both embodiments may be replaced by the stray capacitance in windings L2 and L2', providing there is a sufficient number of turns on these windings.

From the foregoing it will be seen that since few circuit components are required in both embodiments and since a minimum number of windings are employed little internal noise is generated and a high signal-to-noise ratio is thereby provided. Also, the relatively small number of components results in low manufacturing cost.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A magnetic field gradiometer comprising:
   a first and a second ferromagnetic core, each core having wound thereon a drive winding, a feedback winding, and at least one sense winding;
   blocking oscillator means for producing a sequence of drive signals in said drive windings, said drive signals being transformer coupled to said sense windings and said feedback windings, the latter windings feeding signals back to said blocking oscillator and forming with said drive windings the transformer coupling of said blocking oscillator; and
   demodulator means coupled to said sense windings for producing an output voltage proportional only to the difference in ambient field strength between said first and said second cores.

2. The gradiometer of claim 1, wherein said ferromagnetic cores are ring cores.

3. The gradiometer of claim 2, wherein said first and said second ferromagnetic ring cores each have a pair of sense windings wound thereon, said feedback windings being wound around 360° of said ring cores, and each of said sense windings being wound around separate 180° segments of said ring cores, thereby defining a gradiometer sensitive axis.

4. The gradiometer of claim 3, wherein said demodulator means includes means interconnecting said pairs of sense windings for producing a voltage proportional to the difference in ambient magnetic field strength between said first and said second ring cores, and for producing a voltage proportional to said drive signals.

5. The gradiometer of claim 4, wherein each pair of sense windings comprise a first sense winding and a second sense winding, and said interconnecting means comprises:
a first interconnection between said first sense winding of said first ferromagnetic ring core and said second sense winding of said second ferromagnetic ring core;
a second interconnection between said first sense winding of said second ferromagnetic ring core and said second sense winding of said first ferromagnetic ring core; and
a third interconnection between the other end of said second winding of said first ferromagnetic ring core and the other end of said second sense winding of said second ferromagnetic ring core, thereby forming a common juncture.

6. The gradiometer of claim 5, wherein said demodulator means includes:
a first diode having its cathode connected to the other end of said first sense winding of said first ferromagnetic ring core;
a second diode having its cathode connected to the other end of said first sense winding of said second ferromagnetic ring core;
a first resistor connected between the anode of said first diode and said common juncture;
a second resistor connected between the anode of said second diode and said common juncture;
a capacitor connected between the anode of said first diode and the anode of said second diode.

7. The gradiometer of claim 1, wherein said blocking oscillator means comprises a drive circuit and a feedback circuit, said drive circuit comprising said drive windings connected in series, and a transistor, wherein one end of said drive windings is connected to the collector of said transistor, the other end of said drive windings is connectable to a source of unidirectional potential, and the emitter of said transistor is connectable to said source of unidirectional potential, said feedback circuit comprising said feedback windings connected in series, said transistor, a resistor, and a capacitor, wherein one end of said feedback windings is connected to the base of said transistor, and the other end of said feedback windings is connected to one end of the parallel combination of said resistor and said capacitor, and the other end of said parallel combination is connectable to said source of unidirectional potential.

8. The gradiometer of claim 1, wherein said ferromagnetic cores comprise scrolls, and wherein said drive windings, said feedback windings, and said sense windings are wound solenoidally thereon, thereby defining a gradiometer sensitive axis along the longitudinal axis of said scroll cores.

9. The gradiometer of claim 8, wherein the sense winding of said first ferromagnetic scroll core is connected in series to the sense winding of said second ferromagnetic scroll core, thereby forming a common juncture between said sense windings, and said demodulator means comprises:
a first diode having its cathode connected to the other end of said sense winding of said first ferromagnetic scroll core;
a second diode having its cathode connected to the other end of said sense winding of said second ferromagnetic scroll core;
a first resistor connected between the anode of said first diode and said common juncture;
a second resistor connected between the anode of said second diode and said common juncture; and
a capacitor connected between the anode of said first diode and the anode of said second diode.

* * * * *